(12) United States Patent
Hirose et al.

(10) Patent No.: US 9,676,267 B2
(45) Date of Patent: Jun. 13, 2017

(54) DRIVE APPARATUS FOR A VEHICLE

(75) Inventors: Takashi Hirose, Tokyo (JP); Keiji Sato, Tokyo (JP); Keiichi Maruyama, Tokyo (JP); Shogo Oki, Tokyo (JP); Satoshi Inoue, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 722 days.

(21) Appl. No.: 13/137,925

(22) Filed: Sep. 21, 2011

(65) Prior Publication Data
US 2012/0073281 A1 Mar. 29, 2012

(30) Foreign Application Priority Data
Sep. 29, 2010 (JP) ................................. 2010-219240

(51) Int. Cl.
| | |
|---|---|
| *F16H 61/40* | (2010.01) |
| *B60K 6/48* | (2007.10) |
| *B60K 6/543* | (2007.10) |
| *F16H 61/00* | (2006.01) |

(52) U.S. Cl.
CPC ............ *B60K 6/48* (2013.01); *B60K 6/543* (2013.01); *F16H 61/0028* (2013.01); *Y02T 10/6221* (2013.01)

(58) Field of Classification Search
CPC .................................. B60K 6/48; F16H 61/40
USPC .......................................... 60/435, 436, 439
See application file for complete search history.

(56) References Cited

U.S. PATENT DOCUMENTS

| | | | | |
|---|---|---|---|---|
| 5,474,428 A | * | 12/1995 | Kimura et al. | ........... 417/16 |
| 5,856,709 A | * | 1/1999 | Ibaraki et al. | ........... 290/45 |
| 5,993,169 A | * | 11/1999 | Adachi | ........... B60K 6/26 417/223 |
| 6,592,484 B1 | * | 7/2003 | Tsai | ........... B60K 6/365 475/5 |
| 7,128,677 B2 | * | 10/2006 | Supina et al. | ........... 475/5 |
| 8,430,190 B2 | * | 4/2013 | Honda et al. | ........... 180/65.25 |
| 2001/0051556 A1 | * | 12/2001 | Takenaka | ........... 475/5 |
| 2002/0060099 A1 | * | 5/2002 | Takenaka et al. | ........... 180/65.1 |
| 2002/0065168 A1 | * | 5/2002 | Kima | ........... B60K 6/365 477/107 |
| 2002/0084118 A1 | * | 7/2002 | Esaki | ........... 180/65.2 |
| 2003/0094317 A1 | * | 5/2003 | Takizawa et al. | ........... 180/53.8 |
| 2007/0021259 A1 | * | 1/2007 | Tenberge | ........... 475/5 |
| 2012/0277060 A1 | * | 11/2012 | Kubo | ........... B60K 6/48 477/5 |

FOREIGN PATENT DOCUMENTS

| | | | | |
|---|---|---|---|---|
| JP | 2008-296907 A | | 12/2008 | |
| JP | WO 2011086828 A1 | * | 7/2011 | ............... B60K 6/48 |

* cited by examiner

*Primary Examiner* — Eric Keasel
*Assistant Examiner* — Matthew Wiblin
(74) *Attorney, Agent, or Firm* — McGinn IP Law Group, PLLC

(57) ABSTRACT

A drive apparatus for a vehicle includes an engine output system that outputs power from an engine and a power transmission system that transmits the power from the engine output system to a driving wheel. A power transmission path including a chain mechanism and a one-way clutch is provided between an oil pump and a turbine shaft that is part of the engine output system. Another power transmission path including a corresponding chain mechanism and a corresponding one-way clutch is provided between the oil pump and a primary shaft that is part of the power transmission system.

20 Claims, 11 Drawing Sheets

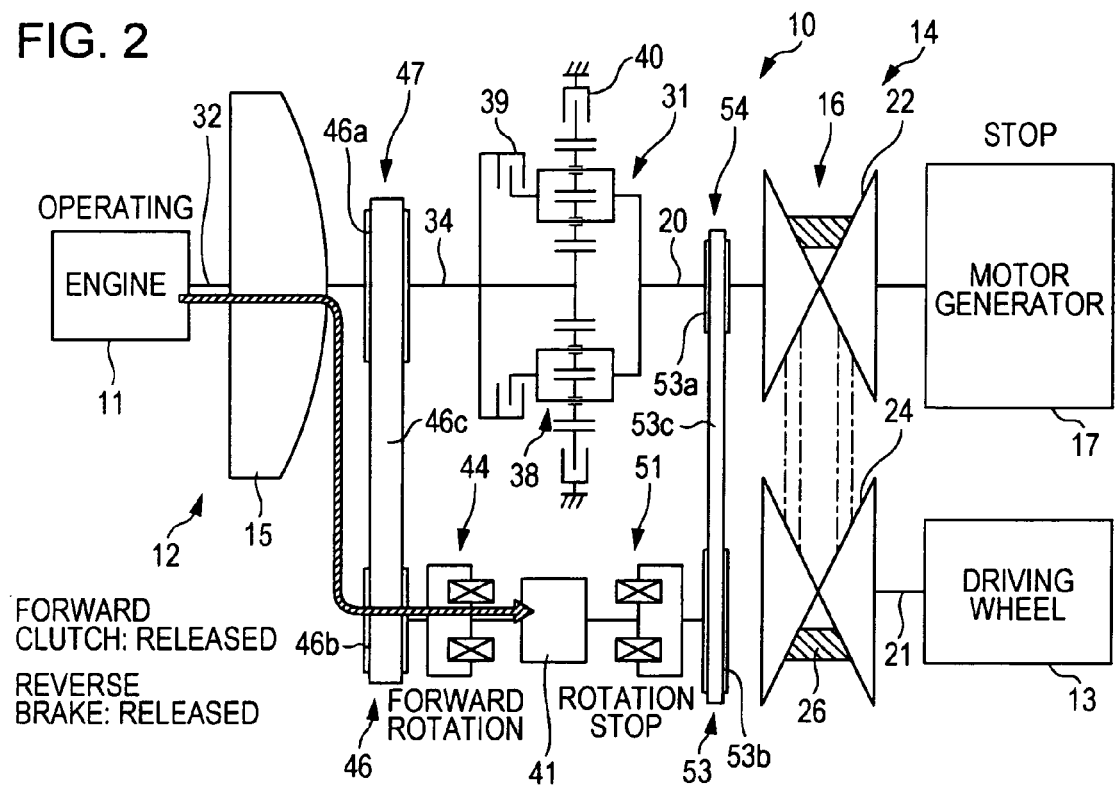
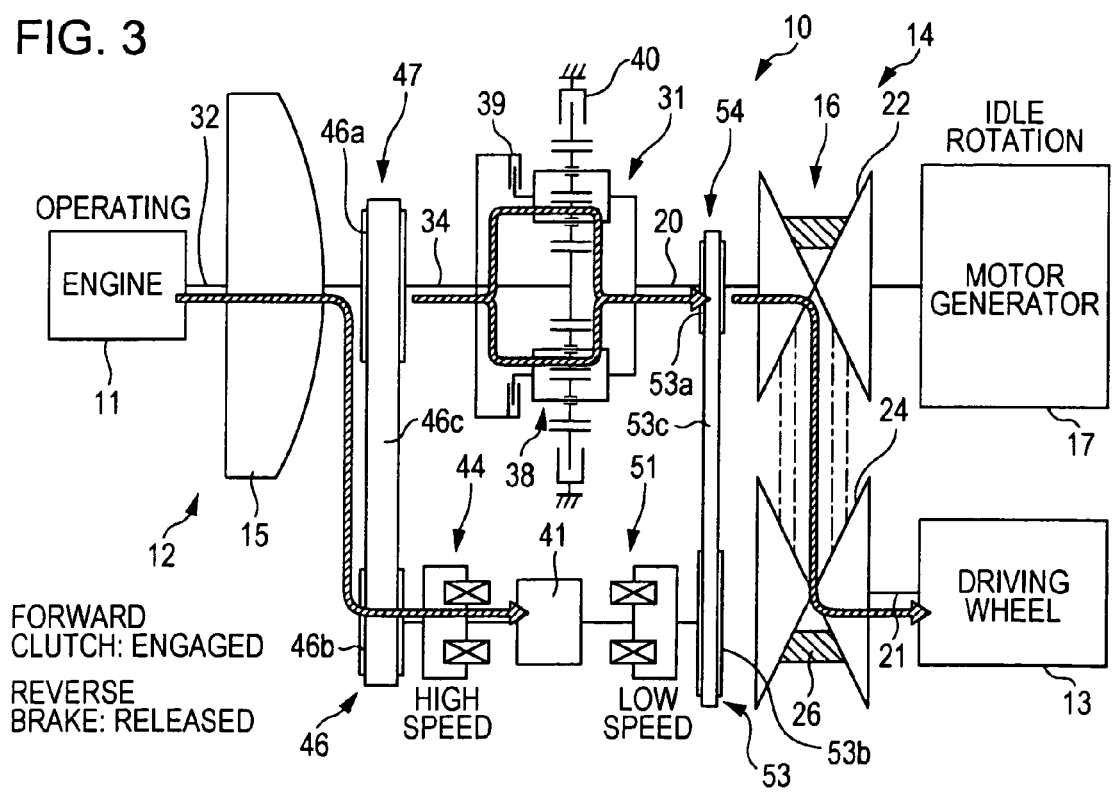

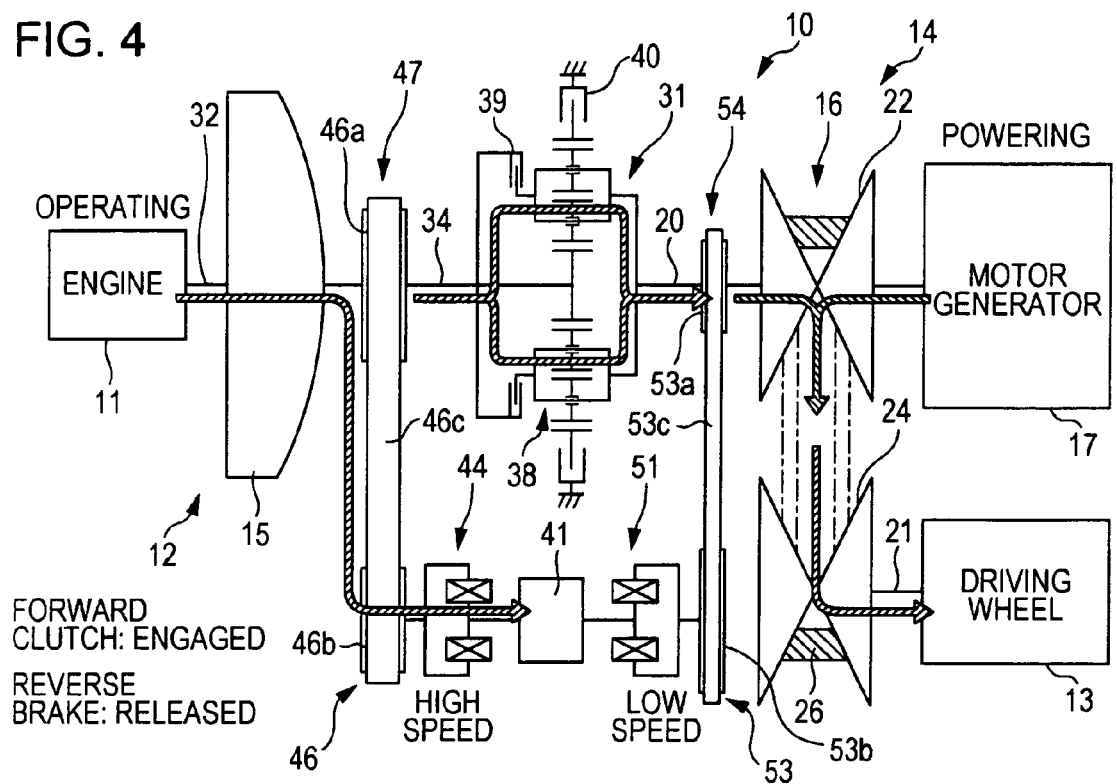
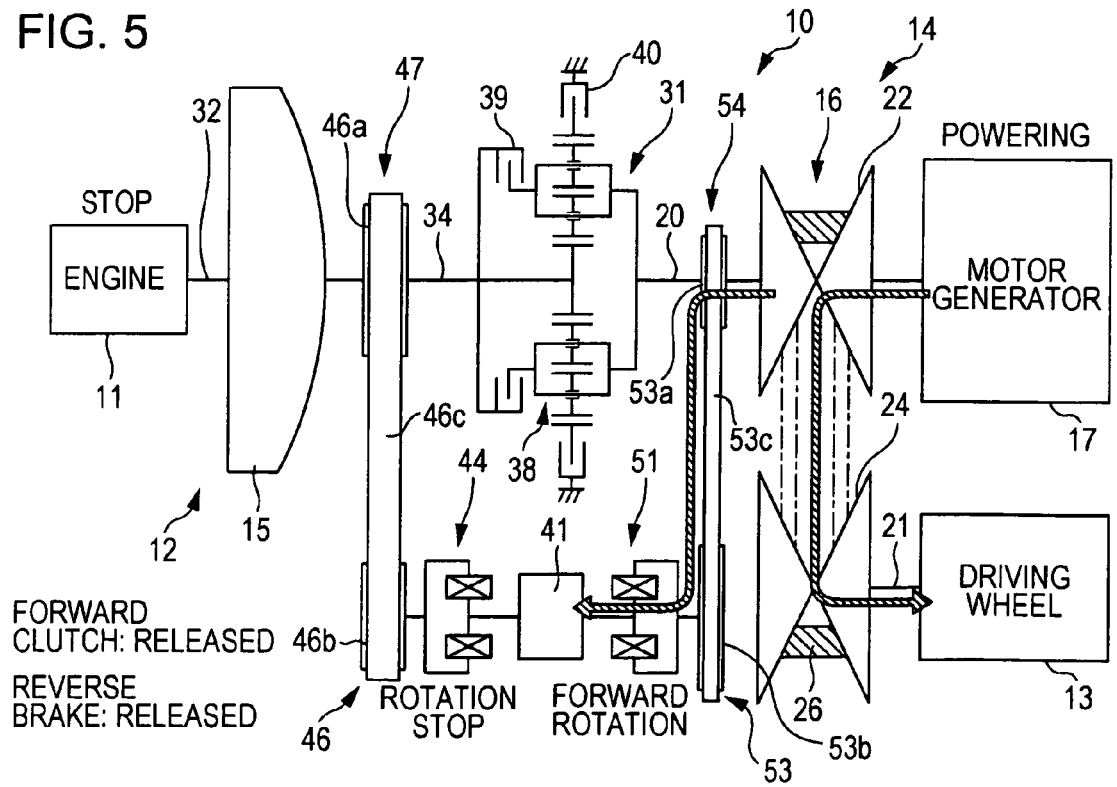

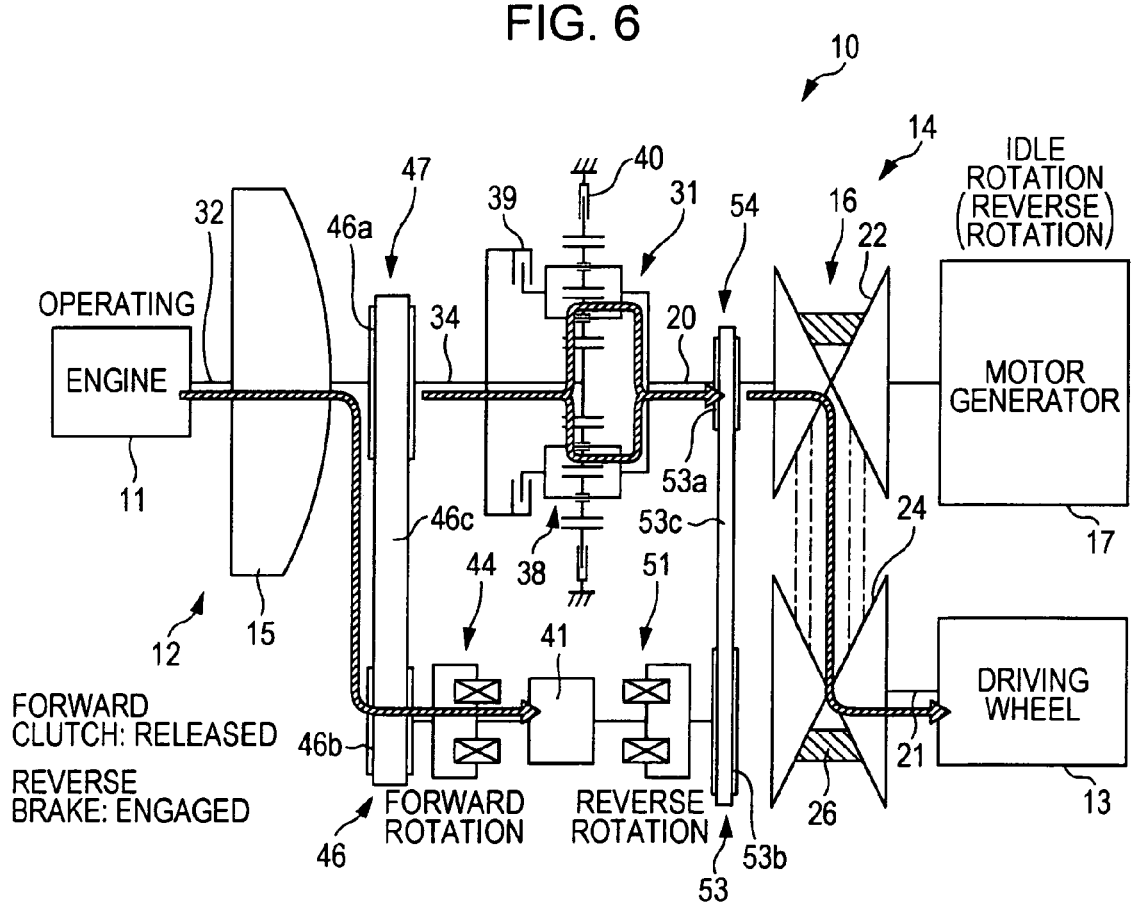

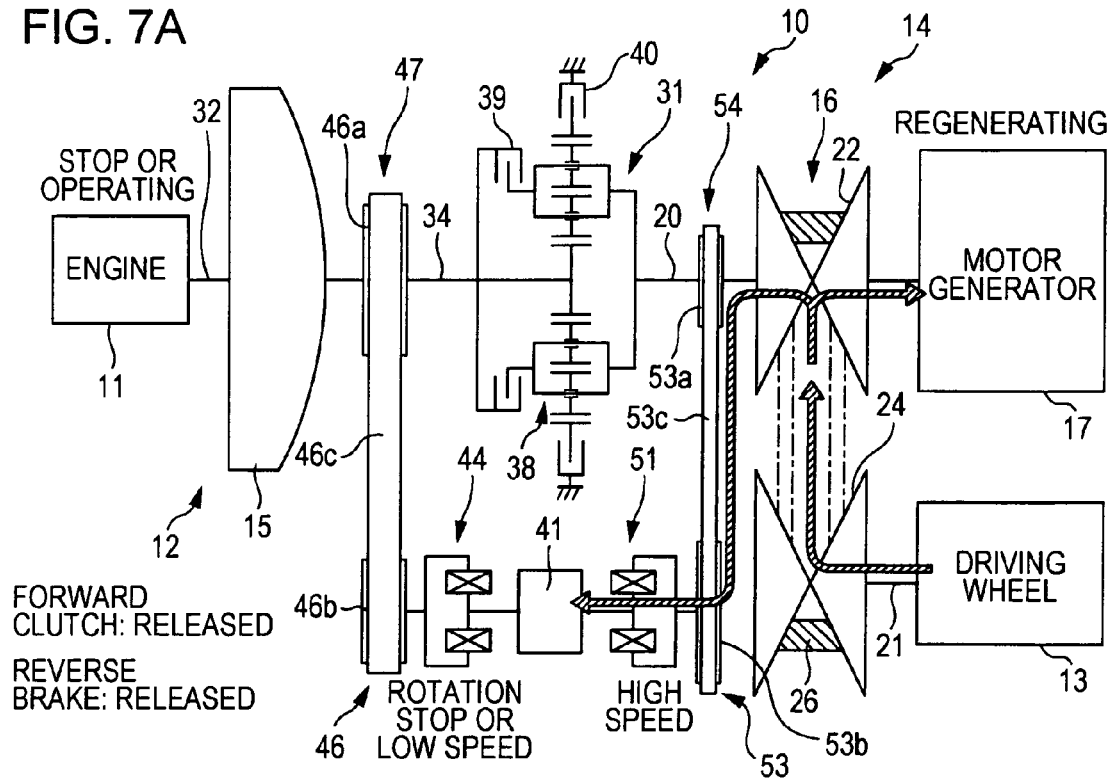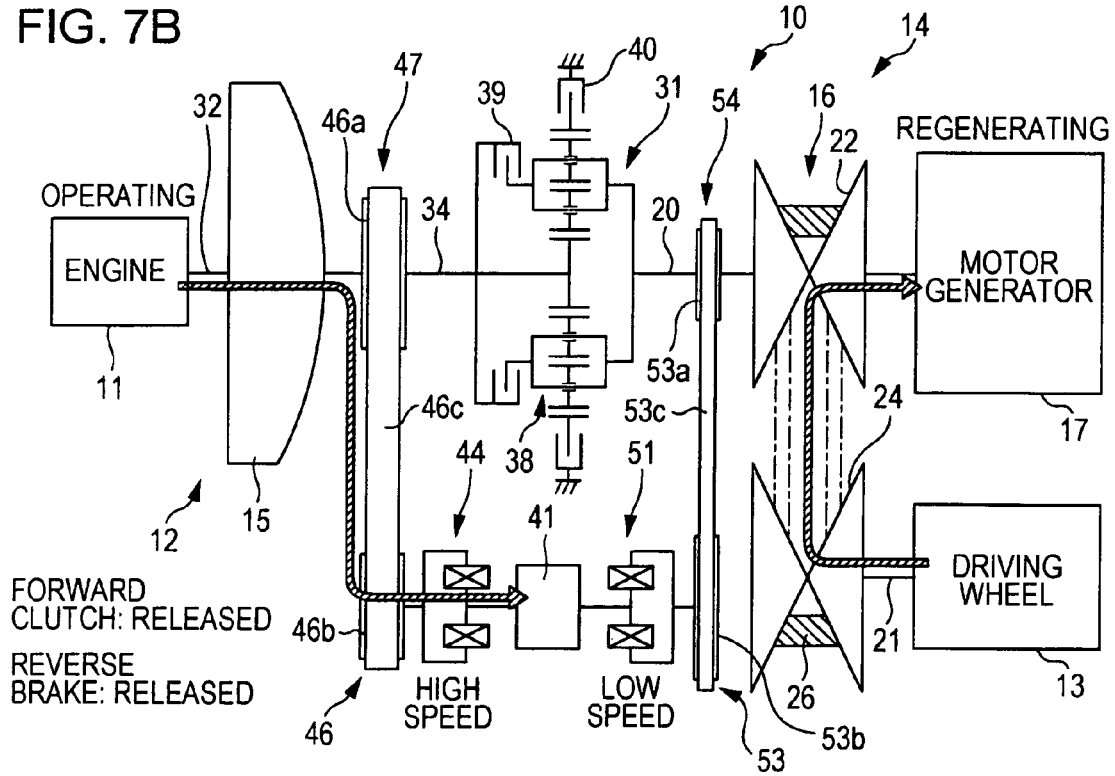

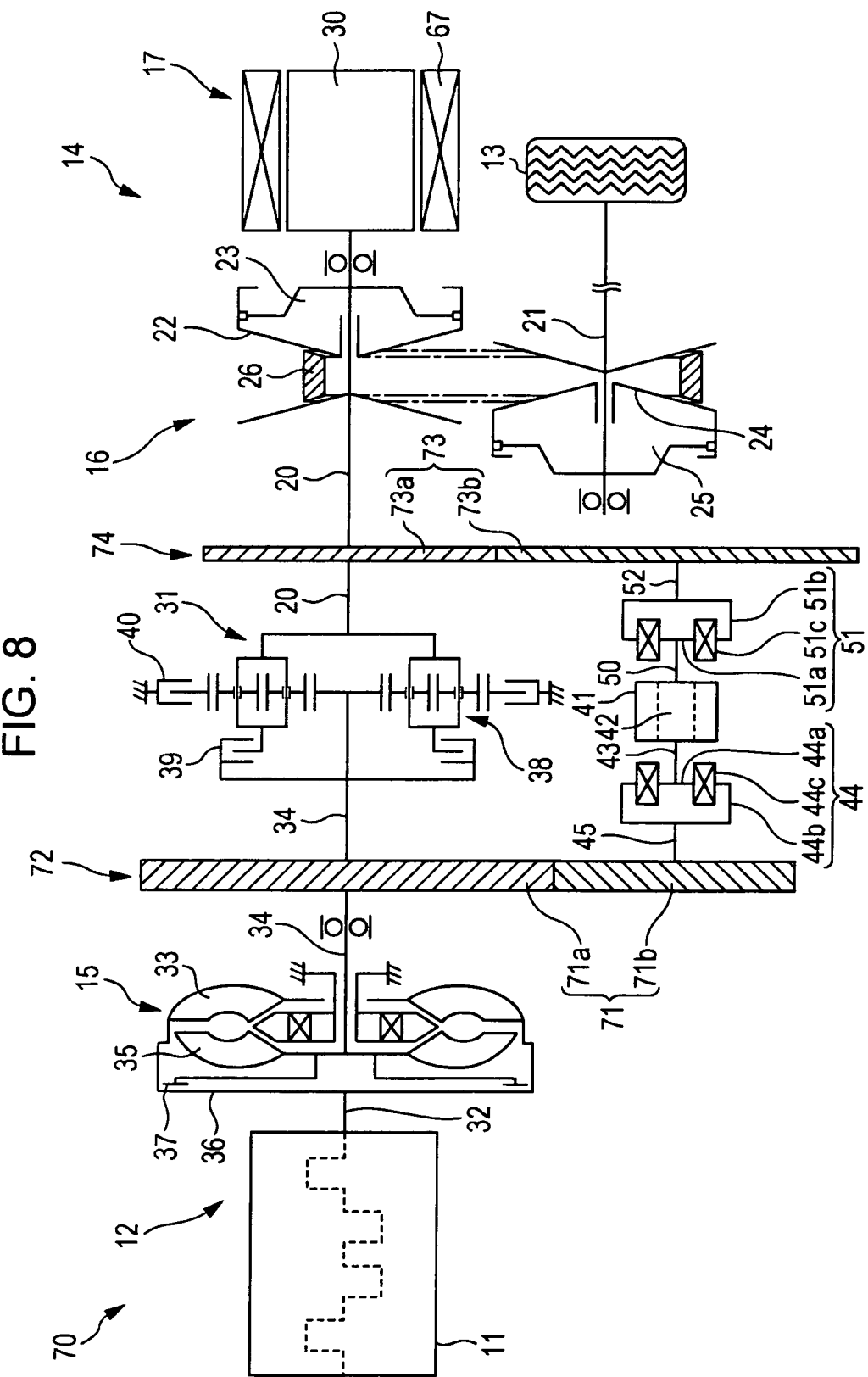

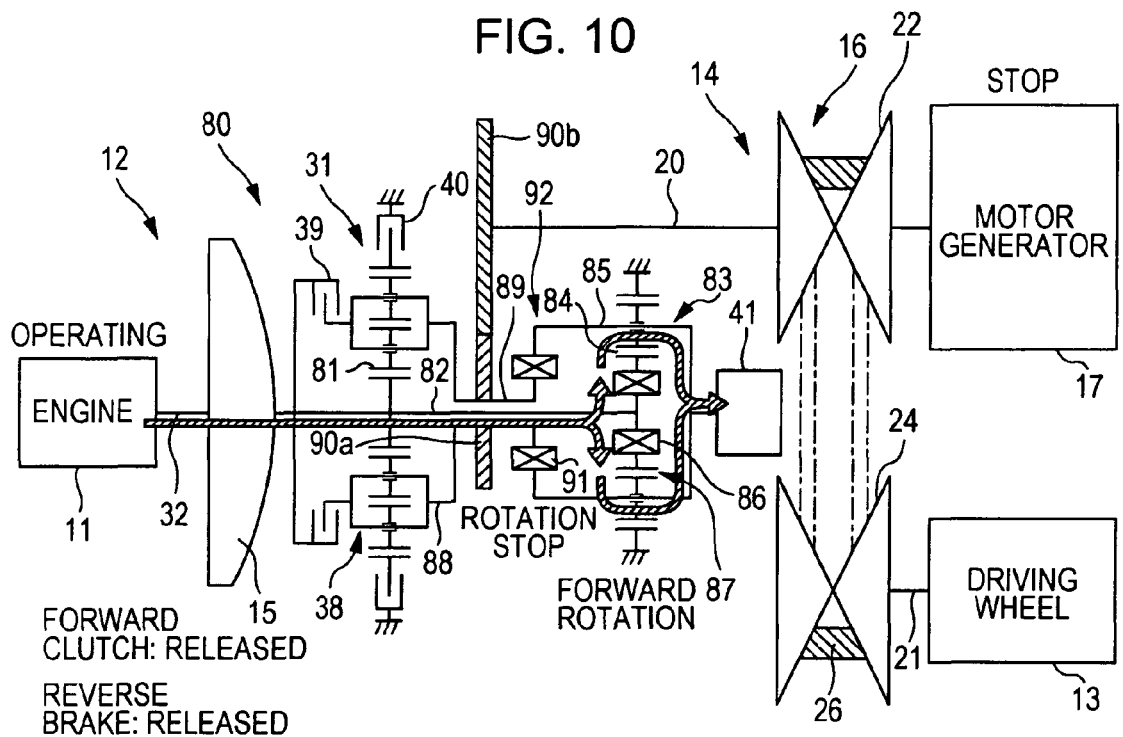
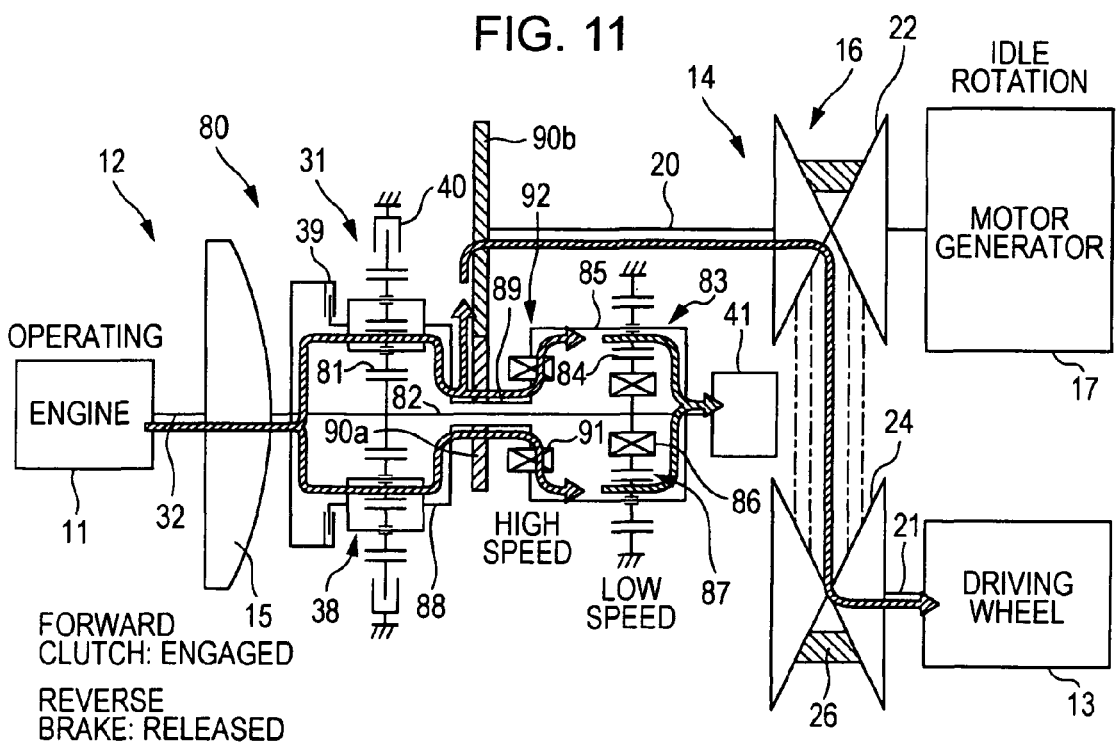

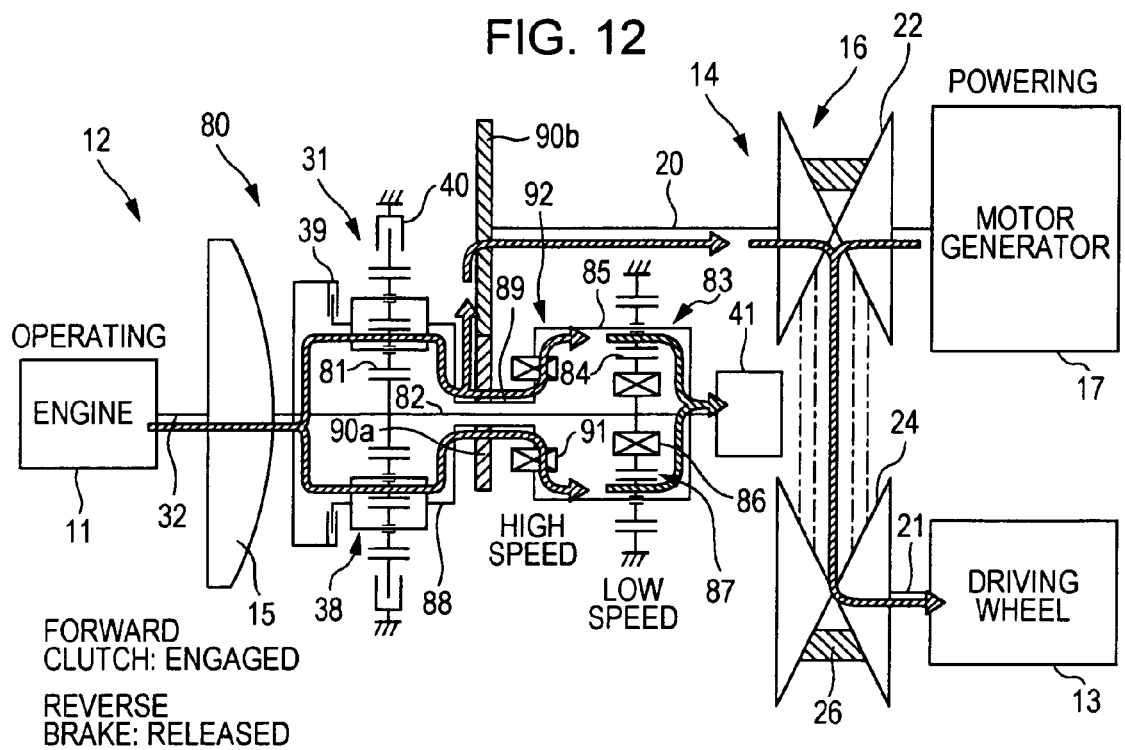
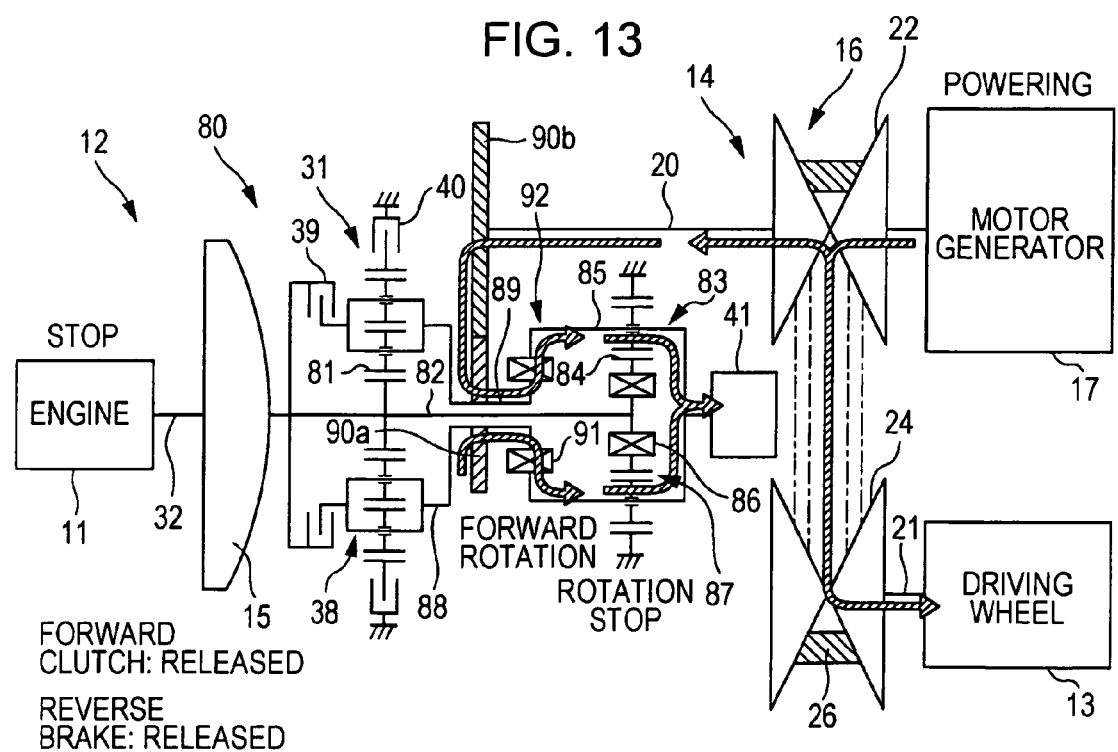

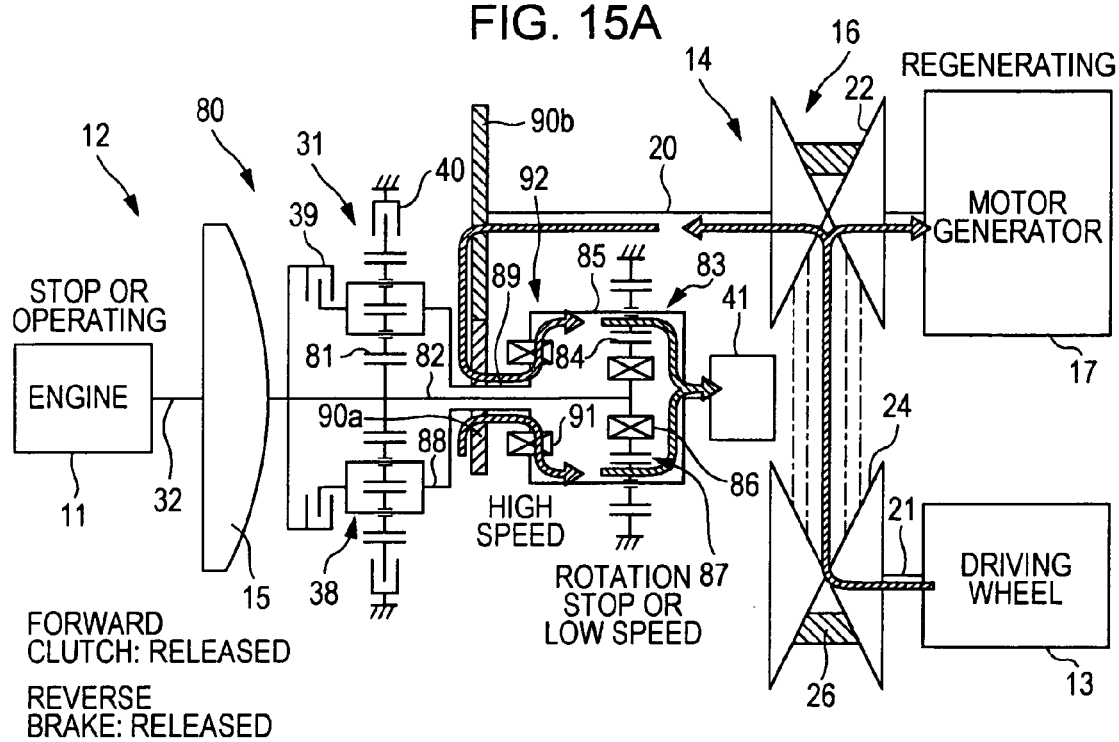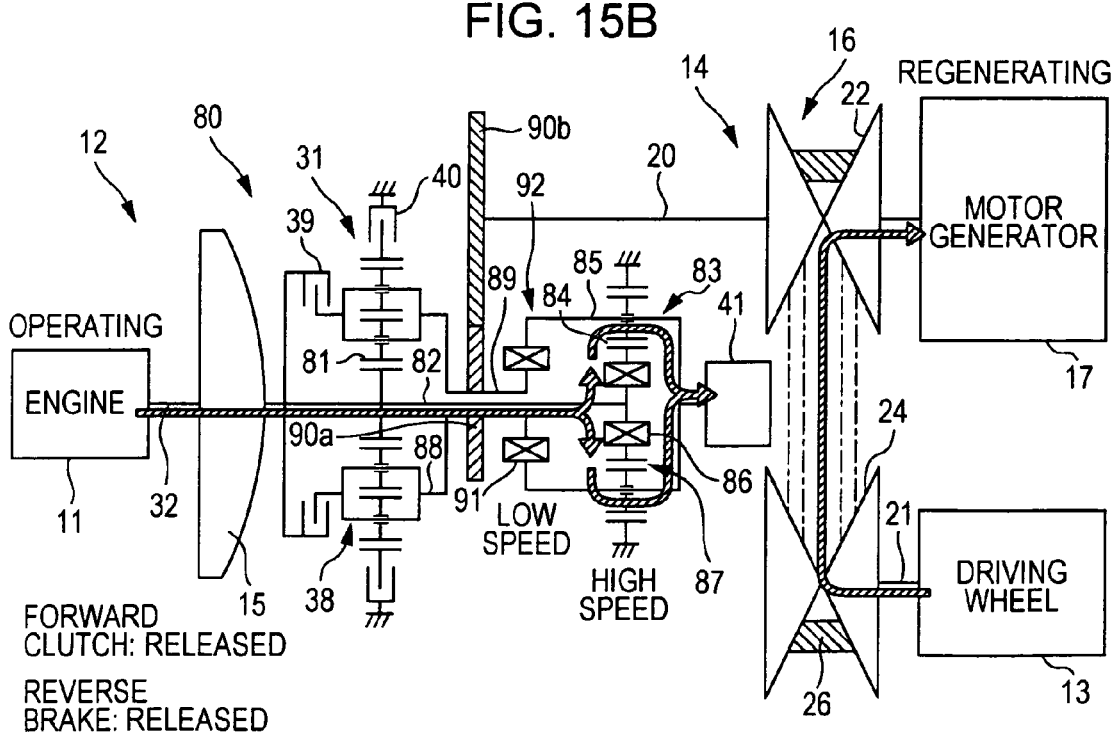

DRIVE APPARATUS FOR A VEHICLE

CROSS-REFERENCE TO RELATED APPLICATIONS

The present application claims priority from Japanese Patent Application No. 2010-219240 filed on Sep. 29, 2010, the entire contents of which are hereby incorporated by reference.

BACKGROUND OF THE INVENTION

1. Field of the Invention

The present invention relates to a drive apparatus for a vehicle including an engine output system that outputs power from an engine and a power transmission system that transmits the power from the engine output system to a driving wheel.

2. Description of the Related Art

Driving methods of a hybrid vehicle that uses an engine and an electrical motor as drive sources includes a series method and a parallel method. In the series method, the engines is driven as a drive source for generating electrical power, and the electrical motor is driven as a drive source for running the vehicle. In the parallel method, the engine is driven as main drive source for running the vehicle, and the electrical motor is driven as an auxiliary drive source for starting or accelerating the vehicle. In addition, a series-parallel method has been developed, in which the series and parallel methods are combined such that one or both of the engine and the electrical motor are driven in accordance with a driving state. In a hybrid vehicle that is driven using the series method or the series-parallel method, the engine can be stopped while the vehicle is running.

In a vehicle in which the engine thereof is stopped while the vehicle is running as described above, it is required to continue to supply hydraulic oil to an automatic transmission mounted in the vehicle. Thus, a drive source for an oil pump other than the engine is required. Accordingly, a drive apparatus for a vehicle has been developed, in which supply of hydraulic oil is continued even when the engine is stopped using an electrical oil pump that is driven by the electrical motor (for example, refer to Japanese Unexamined Patent Application Publication No. 2008-296907).

However, when an electrical oil pump is incorporated into a drive apparatus for a vehicle, a control system becomes complex and the size of a battery increases. This causes the size and the cost of the drive apparatus for a vehicle to increase.

SUMMARY OF THE INVENTION

An object of the present invention is to drive the oil pump even when the engine is stopped without having a complex and expensive drive apparatus for a vehicle.

A drive apparatus for a vehicle according to an aspect of the present invention is provided with an engine output system that outputs power from an engine and a power transmission system that transmits the power from the engine output system to a driving wheel. The drive apparatus for a vehicle includes an oil pump that supplies hydraulic oil to a transmission mechanism of the power transmission system, a first power transmission path that is provided between the engine output system and the oil pump and that connects the engine output system to the oil pump in a specified gear ratio, and a first one-way clutch that is provided in the first power transmission path and that transmits the power from the engine output system to the oil pump while cutting off the power from the oil pump to the engine output system. The drive system for a vehicle also includes a second power transmission path that is provided between the power transmission system and the oil pump and that connects the power transmission system to the oil pump in a specified gear ratio, and a second one-way clutch that is provided in the second power transmission path and that transmits the power from the power transmission system to the oil pump while cutting off the power from the oil pump to the power transmission system. In the drive apparatus for a vehicle, the power is transmitted to the oil pump through the first power transmission path or the second power transmission path.

According to the aspect of the present invention, since the first power transmission path that transmits power from the engine output system to the oil pump and the second power transmission path that transmits the power from the power transmission system to the oil pump are provided, the engine can be stopped while the driving state of the oil pump is maintained. That is, when the engine is stopped, the oil pump can be driven by the power from the power transmission system, thereby eliminating the need for a separate power source of the oil pump that otherwise would be provided so as to supply the power when the engine is stopped. Thus, simplification and cost reduction of the drive apparatus for a vehicle can be achieved. In addition, since the first and second one-way clutches are respectively provided in the first and second power transmission paths, the first and second power transmission paths can be switched from one to the other without complex control.

Preferably, a gear ratio of the first power transmission path and a gear ratio of the second power transmission path are different from each other in the drive apparatus for a vehicle.

Preferably, in the drive apparatus for a vehicle, the second power transmission path is provided between an input side of the transmission mechanism and the oil pump, and the gear ratio of the first power transmission path is set to be smaller than the gear ratio of the second power transmission path.

Preferably, a strength of the second power transmission path is set to be lower than a strength of the first power transmission path in the drive apparatus for a vehicle.

Preferably, each of the first and second power transmission paths includes a gear mechanism or chain mechanism in the drive apparatus for a vehicle.

Preferably, a motor generator is incorporated into the power transmission system in the drive apparatus for a vehicle.

BRIEF DESCRIPTION OF THE DRAWINGS

FIG. 2 is an explanatory diagram illustrating an operating state of the drive apparatus for a vehicle;

FIG. 3 is an explanatory diagram illustrating an operating state of the drive apparatus for a vehicle;

FIG. 4 is an explanatory diagram illustrating an operating state of the drive apparatus for a vehicle;

FIG. 5 is an explanatory diagram illustrating an operating state of the drive apparatus for a vehicle;

FIG. 6 is an explanatory diagram illustrating an operating state of the drive apparatus for a vehicle;

FIGS. 7A and 7B are explanatory diagrams illustrating operating states of the drive apparatus for a vehicle;

FIG. 8 is an outline diagram illustrating a drive apparatus for a vehicle according to another embodiment of the present invention;

FIG. 10 is an explanatory diagram illustrating an operating state of the drive apparatus for a vehicle;

FIG. 11 is an explanatory diagram illustrating an operating state of the drive apparatus for a vehicle;

FIG. 12 is an explanatory diagram illustrating an operating state of the drive apparatus for a vehicle;

FIG. 13 is an explanatory diagram illustrating an operating state of the drive apparatus for a vehicle;

FIGS. 15A and 15B are explanatory diagrams illustrating operating states of the drive apparatus for a vehicle.

DESCRIPTION OF THE PREFERRED EMBODIMENTS

Figure 1:
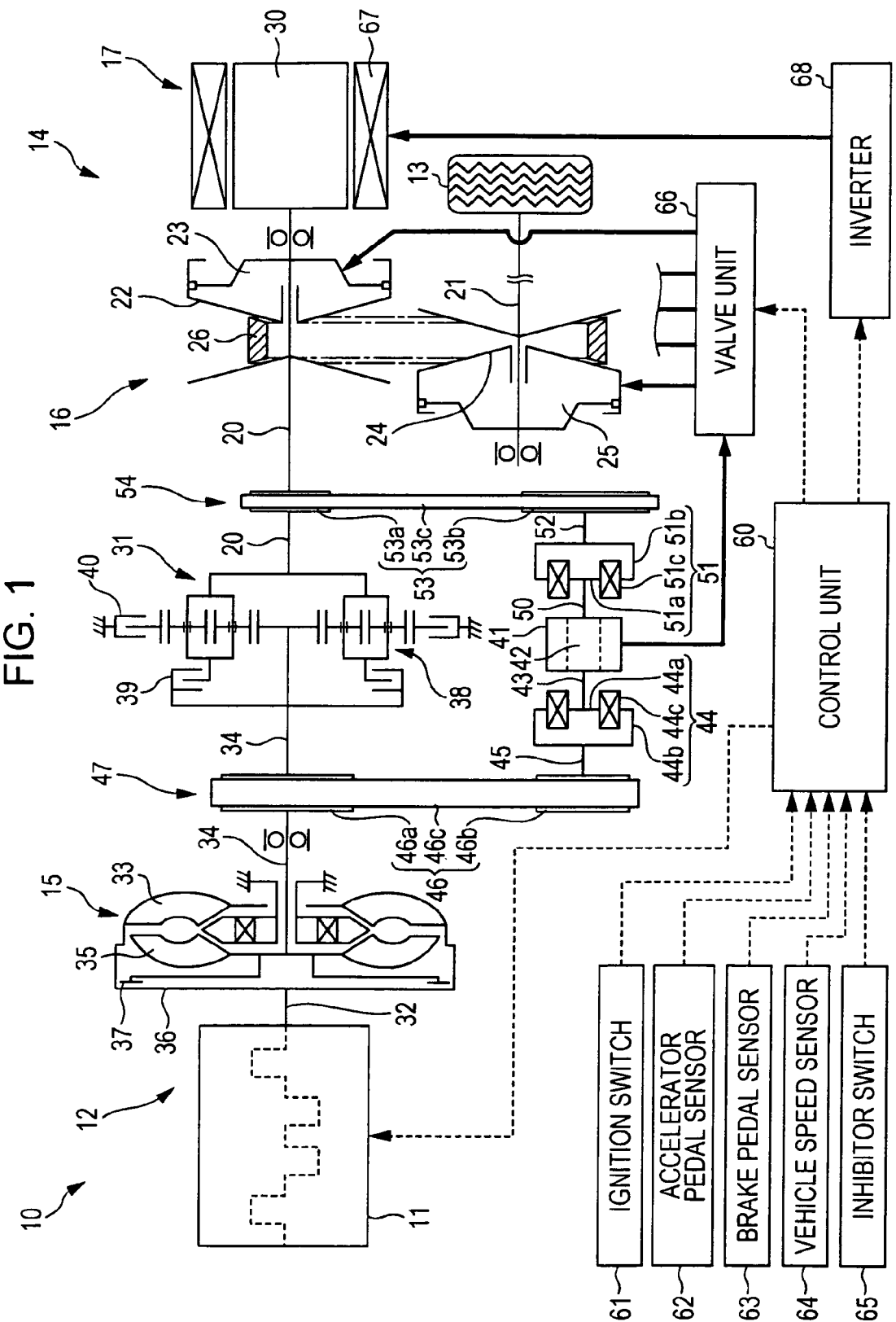
FIG. 1 is an outline diagram illustrating a drive apparatus for a vehicle according to an embodiment of the present invention.

Embodiments according to the present invention will be described in detail below with reference to the drawings. FIG. 1 is an outline diagram illustrating a drive apparatus for a vehicle 10 according to an embodiment of the present invention. As illustrated in FIG. 1, the drive apparatus for a vehicle 10 includes an engine output system 12 and a power transmission system 14. The engine output system 12 outputs power from an engine 11, and the power transmission system 14 transmits the power from the engine Output system 12 to driving wheels 13. The engine output system 12 includes the engine 11 and a torque converter 15. The power transmission system 14 includes a continuously variable transmission (transmission mechanism) 16 and a motor generator 17. The power output from the engine 11 and the motor generator 17 is transmitted to each driving wheel 13 after the speed thereof is changed by a continuously variable transmission 16.

The continuously variable transmission 16 includes a primary shaft 20 and a secondary shaft 21 parallel to the primary shaft 20. The primary shaft 20 is provided with a primary pulley 22. A primary oil chamber 23 is defined on the rear side of the primary pulley 22. The secondary shaft 21 is provided with a secondary pulley 24. A secondary oil chamber 25 is defined on the rear side of the secondary pulley 24. A driving chain 26 is trained around the primary pulley 22 and the secondary pulley 24. By regulating oil pressures of the primary oil chamber 23 and the secondary oil chamber 25, groove widths of the pulleys can be changed so as to change winding diameters for the driving chain 26, thereby allowing the power to be transmitted from the primary shaft 20 to the secondary shaft 21 at continuously variable speeds. The transmission mechanism is not limited to the chain-drive continuously variable transmission 16. The transmission mechanism may use a belt-drive or traction-drive continuously variable transmission, or a planetary-pinion or parallel-shaft automatic transmission.

In order to transmit the motor power to such a continuously variable transmission 16, a rotor 30 of the motor generator 17 is connected to the primary shaft 20 of the continuously variable transmission 16. In order to transmit the engine power to the continuously variable transmission 16, the torque converter 15 and a forward/backward switching mechanism 31 are provided between the engine 11 and the continuously variable transmission 16. The torque converter 15 includes a pump impeller 33 and a turbine runner 35. The pump impeller 33 is connected to a crank shaft 32, and the turbine runner 35 opposes the pump impeller 33 and is connected to a turbine shaft 34. The torque converter 15, which is a sliding element, includes a front cover 36 and a lock-up clutch 37, which directly connects the front cover 36 to the turbine runner 35. The forward/backward switching mechanism 31 includes a double-pinion-type planetary pinion train 38, a forward clutch 39, and a reverse brake 40. By controlling the forward clutch 39 and the reverse brake 40, a transmission path of the engine power can be switched, and accordingly, a rotation direction of the primary shaft 20 can be changed.

The drive apparatus for a vehicle 10 includes an oil pump 41 such as a trochoid pump in order to supply hydraulic oil to the above-described continuously variable transmission 16, the torque converter 15, the forward/backward switching mechanism 31, and the like. A drive shaft 43 is connected to one end of a pump rotor 42 of the oil pump 41. A driven sprocket 46b is connected to the drive shaft 43 with a first one-way clutch 44 and a drive shaft 45 therebetween. A drive sprocket 46a is provided on the turbine shaft 34 that is parallel to the drive shaft 45. The drive sprocket 46a is connected to the driven sprocket 46b using a chain 46c. Thus, a first power transmission path 47 including a chain mechanism 46 and the one-way clutch 44 is provided between the oil pump 41 and the turbine shaft 34 that is part of the engine output system 12.

The one-way clutch 44 includes an inner race 44a, an outer race 44b, and a plurality of sprags 44c. The inner race 44a is connected to the drive shaft 43, the outer race 44b is connected to the drive shaft 45, and the sprags 44c are provided between the races 44a and 44b. The one-way clutch 44 has a structure in which the power is transmitted only in one rotation direction by, when the outer race 44b rotates in a forward rotation direction relative to the inner race 44a, causing the sprags 44c to tilt so as to be engaged with both the races 44a and 44b. That is, the one-way clutch 44 transmits the power from the engine output system 12 to the oil pump 41 while cutting off the power from the oil pump 41 to the engine output system 12. The forward rotation direction of the outer race 44b refers to a rotation direction when the outer race 44b is driven by the engine power. In other words, the forward rotation direction of the outer race 44b is the same rotation direction as that of the crank shaft 32.

A drive shaft 50 is connected to the other end of the pump rotor 42. A driven sprocket 53b is connected to the drive shaft 50 with a second one-way clutch 51 and a drive shaft 52 therebetween. A drive sprocket 53a is provided on the primary shaft 20 that is parallel to the drive shaft 52. The drive sprocket 53a is connected to the driven sprocket 53b using a chain 53c. Thus, a second power transmission path 54 including a chain mechanism 53 and the one-way clutch 51 is provided between the oil pump 41 and the primary shaft 20 that is part of the power transmission system 14. The primary shaft 20 is a member provided on an input side of the continuously variable transmission 16.

The one-way clutch 51 includes an inner race 51a, an outer race 51b, and a plurality of sprags 51c. The inner race 51a is connected to the drive shaft 50, the outer race 51b is connected to the drive shaft 52, and the sprags 51c are provided between the races 51a and 51b. The one-way clutch 51 has a structure in which the power is transmitted only in one rotation direction by, when the outer race 51b rotates in a forward rotation direction relative to the inner race 51a, causing the sprags 51c to tilt so as to be engaged with both the races 51a and 51b. That is, the one-way clutch 51 transmits the power from the power transmission system 14 to the oil pump 41, while cutting off the power from the oil pump 41 to the power transmission system 14. The forward rotation direction of the outer race 51b is a rotation direction when the outer race 51b is driven by the engine power. In other words, the forward rotation direction of the outer race 51b is the same rotation direction as that of the crank shaft 32.

Thus, the two power transmission paths 47 and 54 are provided for the oil pump 41. The two power transmission paths 47 and 54 that transmit the power to the oil pump 41 are switched form one to the other according to the rotational states of the turbine shaft 34 and the primary shaft 20. That is, when the rotation speed of the driven sprocket 46b driven by the turbine shaft 34 is higher than that of the driven sprocket 53b driven by the primary shaft 20, the one-way clutch 51 is released and the one-way clutch 44 is engaged so as to transmit the power from the power transmission path 47 to the oil pump 41. In contrast, when the rotation speed of the driven sprocket 46b is lower than that of the driven sprocket 53b, the one-way clutch 44 is released and the one-way clutch 51 is engaged so as to transmit the power from the power transmission path 54 to the oil pump 41.

A transmission gear ratio (sprocket ratio) of the chain mechanism 46 that is part of the power transmission path 47 is set to be smaller than that of the chain mechanism 53 that is part of the power transmission path 54. In other words, the ratio of the number of gear teeth A2 of the driven sprocket 46b to the number of gear teeth A1 of the drive sprocket 46a (A2/A1) is set to be smaller than that of the number of gear teeth B2 of the driven sprocket 53b to the number of gear teeth B1 of the drive sprocket 53a (B2/B1). Thus, by setting the gear ratios of the chain mechanisms 46 and 53 to be different from each other, a situation in which the two driven sprockets 46b and 53b continue to rotate at the same rotation speed can be avoided, and accordingly, a situation in which the power is transmitted from both of the power transmission paths 47 and 54 can be avoided. In other words, when a vehicle is in a running state in which the forward clutch 39 is engaged, the rotation speeds of the turbine shaft 34 and the primary shaft 20 match, that is, the rotation speeds of the drive sprockets 46a and 53a match. Even in this case, the rotation speeds of the driven sprockets 46b and 53b can be different from each other due to the difference between the gear ratios.

When the forward clutch 39 of the forward/backward switching mechanism 31 is engaged, the rotation speeds of the turbine shaft 34 and the primary shaft 20 match. In this case, since the rotation speed of the driven sprocket 46b is higher than that of the driven sprocket 53b, the power is transmitted from the power transmission path 47 on the engine 11 side to the oil pump 41. When the reverse brake 40 of the forward/backward switching mechanism 31 is engaged, the primary shaft 20 rotates in a direction opposite the rotation direction of the turbine shaft 34. In this case, since the driven sprocket 53b rotates in a direction opposite the rotation direction of the driven sprocket 46b that rotates in a forward direction, the power is transmitted from the power transmission path 47 on the engine 11 side to the oil pump 41. When the forward clutch 39 and the reverse brake 40 are released and the engine 11 is stopped while the vehicle is running, the turbine shaft 34 stops and the primary shaft 20 continues to rotate. In this case, since the rotation speed of the driven sprocket 53b is higher than that of the driven sprocket 46b, the power is transmitted from the power transmission path 54 on the motor generator 17 side to the oil pump 41.

A control unit 60 is provided in the drive apparatus for a vehicle 10 in order to control components such as the engine 11, the motor generator 17, and the continuously variable transmission 16. An ignition switch 61, an accelerator pedal sensor 62, a brake pedal sensor 63, a vehicle speed sensor 64, an inhibitor switch 65, and the like are connected to this control unit 60. The ignition switch 61 is operated by a driver, the accelerator pedal sensor 62 detects an operational state of an accelerator pedal, the brake pedal sensor 63 detects an operational state of a brake pedal, the vehicle speed sensor 64 detects a vehicle speed, and the inhibitor switch 65 detects a selected driving range. The control unit 60 determines the state of the vehicle based on information from the sensors and the like and outputs control signals to the engine 11, the motor generator 17, and the like. The control unit 60 includes a central processing unit (CPU) that performs computation of the control signals and the like, a read only memory (ROM) that stores a control program, computing expressions, map data, and the like, and a random access memory (RAM) that temporarily stores data. In order to control supply of the hydraulic oil discharged from the oil pump 41 to the continuously variable transmission 16 and the like, the drive apparatus for a vehicle 10 is provided with a valve unit 66 including a plurality of magnetic valves. In addition, in order to control supply of electrical power to the motor generator 17, a battery (not shown) is connected to a stator 67 of the motor generator 17 with an inverter 68 therebetween.

Next, operating states of the drive apparatus for a vehicle 10 will be described. FIGS. 2 to 7B are explanatory diagrams illustrating the operating states of the drive apparatus for a vehicle 10. FIG. 2 illustrates a state in which the vehicle is stopped, FIG. 3 illustrates a state in which the vehicle is running forward in an engine drive mode, and FIG. 4 illustrates a state in which the vehicle is running forward in a parallel drive mode. FIG. 5 illustrates a state in which the vehicle is running forward in a motor drive mode, and FIG. 6 illustrates a state in which the vehicle is running in reverse in the engine drive mode. FIG. 7A illustrates a state in which regenerative braking operates when the vehicle decelerates, and FIG. 7B illustrates a state in which regenerative braking operates immediately before the vehicle is stopped.

The engine drive mode refers to a drive mode in which only the engine power is transmitted to the driving wheel 13, and the motor drive mode refers to a drive mode in which only the motor power is transmitted to the driving wheel 13. The parallel drive mode refers to a drive mode in which the motor power and the engine power are transmitted to the driving wheel 13. In FIGS. 2 to 7B, hatched arrows represent power transmission paths. Also in FIGS. 2 to 7B, terms "ROTATION STOP", "FORWARD ROTATION", "REVERSE ROTATION", "HIGH SPEED", and "LOW SPEED" represent rotational states of the driven sprocket 46b (outer race 44b) and the driven sprocket 53b (outer race 51b).

As illustrated in FIG. 2, when the vehicle is stopped, the engine 11 is started while the forward clutch 39 and the reverse brake 40 remain released. In this case, since the turbine shaft 34 rotates and the primary shaft 20 stops, the engine power is transmitted to the oil pump 41 through the power transmission path 47. Thus, the oil pump 41 can be driven by the engine power when the vehicle is stopped.

As illustrated in FIGS. 3 and 4, when the vehicle is running forward in the engine drive mode or the parallel drive mode, the forward clutch 39 is engaged while the reverse brake 40 remains released. In this case, since the rotation speeds of the turbine shaft 34 and the primary shaft 20 match and the driven sprocket 46b rotates at a speed higher than that at which the driven sprocket 53b rotates, the engine power is transmitted to the oil pump 41 through the power transmission path 47. Thus, the oil pump 41 can be driven by the engine power when the vehicle is running forward in the engine drive mode or the parallel drive mode. In the engine drive mode, the motor generator 17 is controlled so as to enter an idle rotation state. In the parallel drive mode, the motor generator 17 is controlled so as to enter the powering state.

As illustrated in FIG. 5, when the vehicle is running forward in the motor drive mode, the forward clutch 39 is released and the engine 11 is stopped from the above-described state in which the vehicle is running forward in the parallel drive mode. In this case, since the turbine shaft 34 stops and the primary shaft 20 continues to rotate, the motor power is transmitted to the oil pump 41 through the power transmission path 54. Thus, the oil pump 41 can be driven by the motor power when the vehicle is running forward in the motor drive mode. When the drive mode is switched from the parallel drive mode to the motor drive mode, the power transmission path is automatically switched from the power transmission path 47 to the power transmission path 54 due to a decrease in the rotation speed of the turbine shaft 34.

As illustrated in FIG. 6, when the vehicle is running in reverse in the engine drive mode, the state of the reverse brake 40 is switched to an engaged state from the above-described state in which the vehicle is stopped. In this case, since the driven sprocket 53b rotates in a direction opposite the rotation direction of the driven sprocket 46b that rotates in a forward direction, the engine power is transmitted to the oil pump 41 through the power transmission path 47. Thus, the oil pump 41 can be driven by the engine power when the vehicle is running in reverse in the engine drive mode.

Referring next to FIG. 7A, when regenerative braking operates due to release of the accelerator pedal or depression of the brake pedal, the forward clutch 39 is released and the motor generator 17 is controlled so as to enter a regenerative state. In this case, since the engine 11 is stopped or operated at a low load, the primary shaft 20 rotates at a speed higher than that at which the turbine shaft 34 rotates, and accordingly, the power from the driving wheel 13 is transmitted to the oil pump 41 through the power transmission path 54. Thus, the oil pump 41 can be driven by the power from the driving wheel 13 when regenerative braking operates. At a time immediately before the vehicle stops in which the rotation speed of the primary shaft 20 decreases, the rotation speed of the engine is increased to a range required for driving the oil pump 41 in order to maintain a driving state of the oil pump 41. Since this makes the rotation speed of the turbine shaft 34 be higher than that of the primary shaft 20, the engine power is transmitted to the oil pump 41 through the power transmission path 47.

As described above, since the power transmission path 47 that transmits the power from the engine output system 12 to the oil pump 41 and the power transmission path 54 that transmits the power from the power transmission system 14 to the oil pump 41 are provided, the engine 11 can be stopped while the driving state of the oil pump 41 is maintained. That is, as illustrated in FIGS. 5 and 7A, when the engine 11 is stopped, the oil pump 41 can be driven by the power from the power transmission system 14, thereby eliminating the need for a separate power source of the oil pump 41 that otherwise would be provided so as to supply the power when the engine 11 is stopped. Thus, simplification and cost reduction of the drive apparatus for a vehicle 10 can be achieved. In addition, since the power transmission paths 47 and 54 respectively include the one-way clutches 44 and 51, the power transmission paths 47 and 54 can be appropriately switched from one to the other without complex control.

The chain mechanisms 46 and 53, which are respectively part of the power transmission paths 47 and 54, have the gear ratios different from each other. Thus, resonance can be suppressed by shifting the natural frequencies of the gear mechanisms 46 and 53 from each other. In addition, by setting the gear ratios of the chain mechanisms 46 and 53 to be different from each other, the power can be constantly transmitted to the oil pump 41 from either one of the power transmission paths 47 and 54. Thus, generation of noise that otherwise would occur due to play or the like of components included in the power transmission paths 47 and 54 can be suppressed.

Furthermore, by setting the gear ratio of the chain mechanism 46 to be smaller than that of the chain mechanism 53, the power is transmitted from the chain mechanism 46 when the engine 11 is operated, and the power is transmitted from the chain mechanism 53 when the engine 11 is stopped. That is, the use of the chain mechanism 53 can be less frequent compared to that of the chain mechanism 46. This allows the strength of the chain mechanism 53 to be decreased compared to the chain mechanism 46. Thus, the size of the chain mechanism 53 can be reduced, and cost reduction of the drive apparatus for a vehicle 10 can be achieved.

While the power transmission paths 47 and 54 respectively include the chain mechanisms 46 and 53 in the above description, the structures of the power transmission paths 47 and 54 are not limited to these. The power transmission paths 47 and 54 may include gear mechanisms. FIG. 8 is an outline diagram illustrating a drive apparatus for a vehicle 70 according to another embodiment of the present invention. In FIG. 8, components similar to those illustrated in FIG. 1 are denoted by the same signs and the descriptions thereof are omitted.

As illustrated in FIG. 8, a drive gear 71a is secured to the turbine shaft 34, and a driven gear 71b, which is engaged with the drive gear 71a, is secured to the drive shaft 45. Thus, the first power transmission path 72, which is provided between the oil pump 41 and the turbine shaft 34, includes a gear mechanism 71 that includes the drive gear 71a and the driven gear 71b. A drive gear 73a is secured to the primary shaft 20, and a driven gear 73b, which is engaged with the drive gear 73a, is secured to the drive shaft 52. Thus, the second power transmission path 74, which is provided between the oil pump 41 and the primary shaft 20, includes a gear mechanism 73 that includes the drive gear 73a and the driven gear 73b. With the structure as above in which the power transmission paths 72 and 74 include the gear mechanisms 71 and 73, advantages similar to those of the above-described drive apparatus for a vehicle 10 can be obtained.

As illustrated in FIG. 8, the gear ratio of the gear mechanism 71 is set to be smaller than that of the gear mechanism 73. Thus, by setting the gear ratios of the gear mechanisms 71 and 73 to be different from each other, as is the case with the drive apparatus for a vehicle 10, resonance can be suppressed by shifting the natural frequencies of the gear mechanisms 71 and 73 from each other. In addition, by setting the gear ratios of the gear mechanisms 71 and 73 to be different from each other, power can be constantly transmitted to the oil pump 41 from either one of the power transmission paths 72 and 74. Thus, generation of noise that otherwise would occur due to play or the like of components included in the power transmission paths 72 and 74 can be suppressed.

Furthermore, by setting the gear ratio of the gear mechanism 71 to be smaller than that of the gear mechanism 73, the power is transmitted from the gear mechanism 71 when the engine 11 is operated, and the power is transmitted from the gear mechanism 73 when the engine 11 is stopped. That is, the use of the gear mechanism 73 can be less frequent compared to that of the gear mechanism 71. This allows the strength of the gear mechanism 73 to be decreased compared to the gear mechanism 71. Thus, the size of the gear mechanism 73 can be reduced, and cost reduction of the drive apparatus for the vehicle 70 can be achieved.

Figure 9:
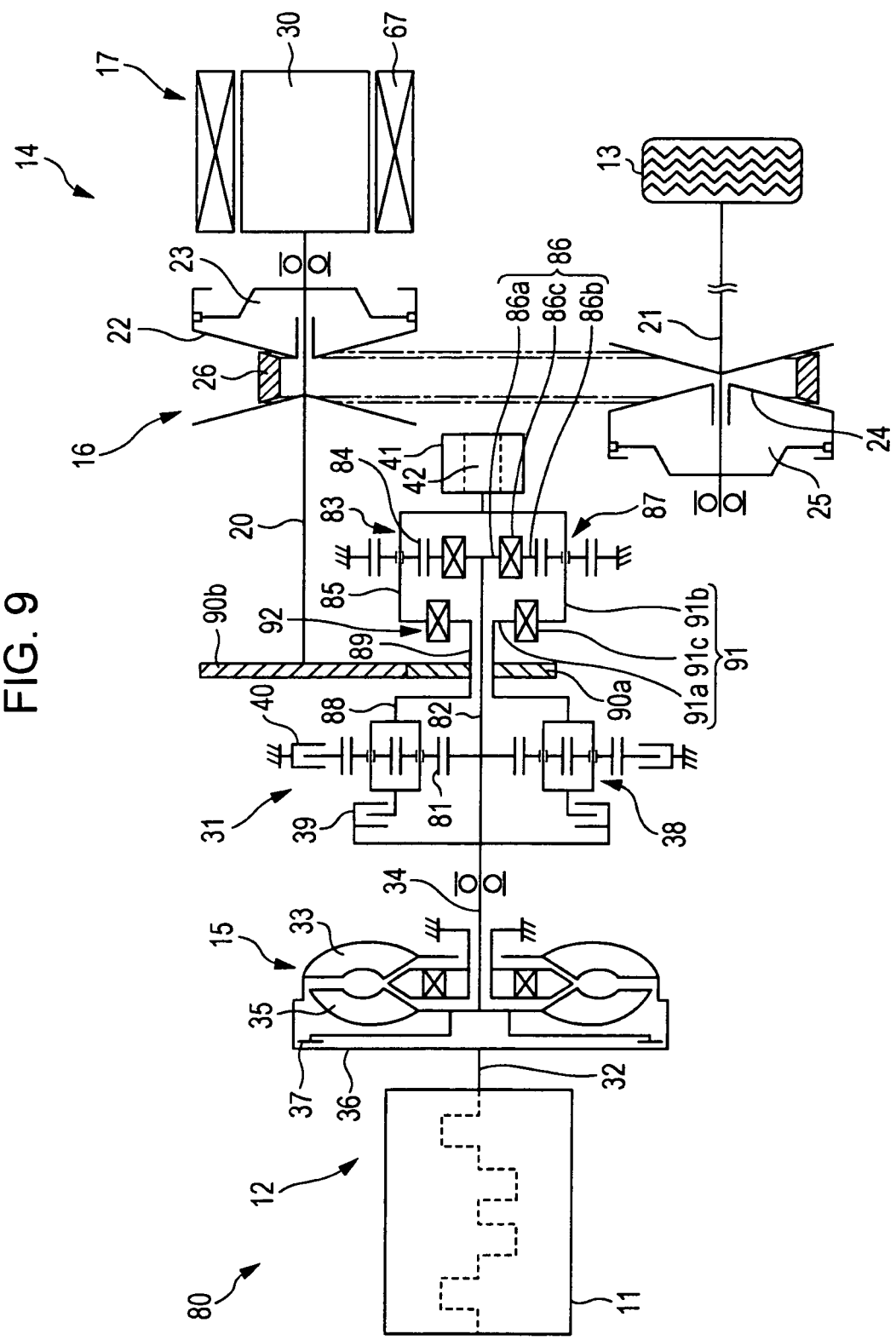
FIG. 9 is an outline diagram illustrating a drive apparatus for a vehicle according to yet another embodiment of the present invention.

Next, a drive apparatus for a vehicle 80 according to yet another embodiment of the present invention will be described. FIG. 9 is an outline diagram illustrating the drive apparatus for a vehicle 80 according to the embodiment of the present invention. In FIG. 9, components similar to those illustrated in FIG. 1 are denoted by the same signs and the descriptions thereof are omitted.

As illustrated in FIG. 9, the drive apparatus for a vehicle 80 includes the engine output system 12 and the power transmission system 14. The engine output system 12 outputs the power from the engine 11, and the power transmission system 14 transmits the power from the engine output system 12 to the driving wheel 13. The engine output system 12 includes the engine 11 and the torque converter 15. The power transmission system 14 includes the continuously variable transmission 16 and the motor generator 17. The turbine shaft 34 of the torque converter 15 is connected to a sun gear 81 of the forward/backward switching mechanism 31 and also connected to an engine output shaft 82 that is disposed so as to be concentric with the turbine shaft 34. The engine output shaft 82 is connected to a sun gear 84 of a planetary pinion mechanism 83, and a carrier 85 of the planetary pinion mechanism 83 is connected to the pump rotor 42. A first one-way clutch 86 is provided in the sun gear 84 of the planetary pinion mechanism 83. Thus, a first power transmission path 87 including the engine output shaft 82, the one-way clutch 86, and the planetary pinion mechanism 83 is provided between the oil pump 41 and the turbine shaft 34 that is part of the engine output system 12.

The one-way clutch 86 includes an inner race 86a, an outer race 86b, and a plurality of sprags 86c. The inner race 86a is connected to the engine output shaft 82, the outer race 86b is connected to the sun gear 84, and the sprags 86c are provided between the races 86a and 86b. The one-way clutch 86 has a structure in which the power is transmitted only in one rotation direction by, when the inner race 86a rotates in a forward rotation direction relative to the outer race 86b, causing the sprags 86c to tilt so as to be engaged with both the races 86a and 86b. That is, the one-way clutch 86 transmits the power from the engine output system 12 to the oil pump 41, while cutting off the power from the oil pump 41 to the engine output system 12. The forward rotation direction of the inner race 86a refers to a rotation direction when the inner race 86a is driven by the engine power. That is, the forward rotation direction of the inner race 86a is the same rotation direction as that of the crank shaft 32.

A drive gear 90a is secured to a hollow shaft 89 that is connected to a carrier 88 of the forward/backward switching mechanism 31, and a driven gear 90b, which is engaged with the drive gear 90a, is secured to the primary shaft 20 that is parallel to the hollow shaft 89. The carrier 85 of the planetary pinion mechanism 83 is secured to the hollow shaft 89, and a second one-way clutch 91 is provided in the carrier 85. Thus, a second power transmission path 92 including the one-way clutch 91 and the planetary pinion mechanism 83 is provided between the oil pump 41 and the hollow shaft 89 that is part of the power transmission system 14.

The one-way clutch 91 includes an inner race 91a, an outer race 91b, and a plurality of sprags 91c. The inner race 91a is connected to the hollow shaft 89, the outer race 91b is connected to the carrier 85, and the sprags 91c are provided between the races 91a and 91b. The one-way clutch 91 has a structure in which the power is transmitted only in one rotation direction by, when the inner race 91a rotates in a forward rotation direction relative to the outer race 91b, causing the sprags 91c to tilt so as to be engaged with both the races 91a and 91b. That is, the one-way clutch 91 transmits the power from the power transmission system 14 to the oil pump 41, while cutting off the power from the oil pump 41 to the power transmission system 14. The forward rotation direction of the inner race 91a is a rotation direction when the inner race 91a is driven by the engine power. That is, the forward rotation direction of the inner race 91a is the same rotation direction as that of the crank shaft 32.

Figure 14:
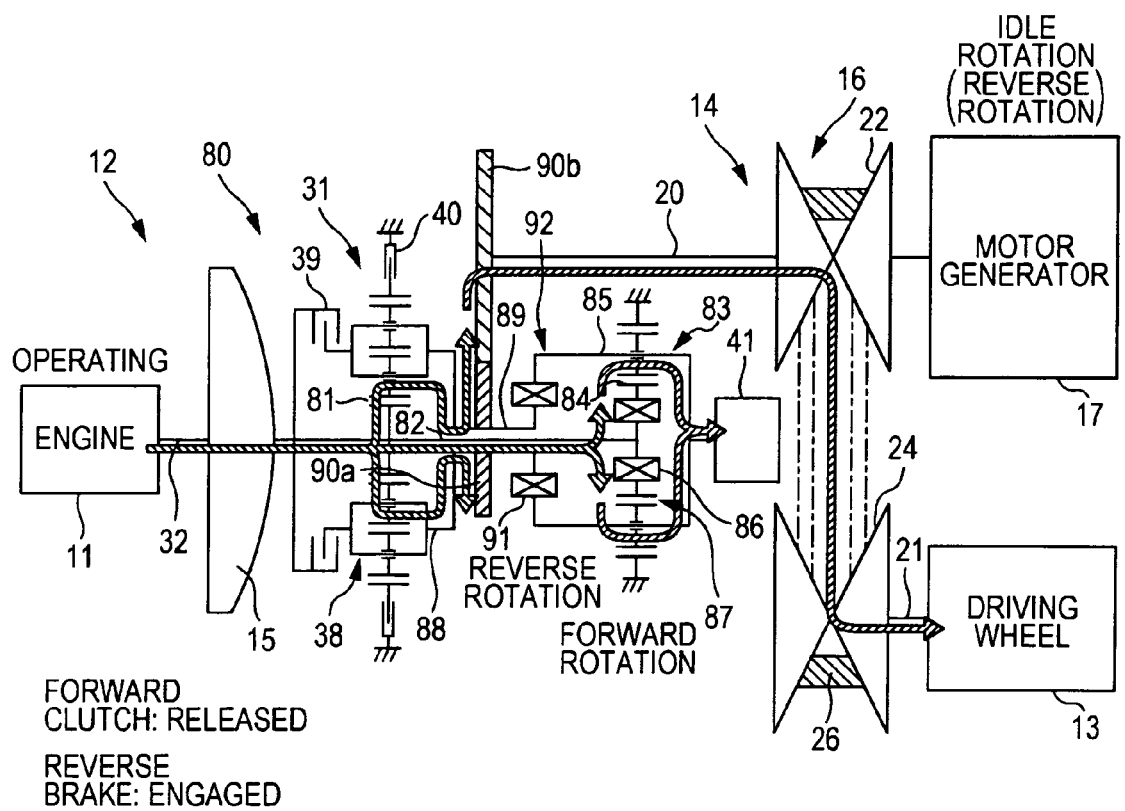
FIG. 14 is an explanatory diagram illustrating an operating state of the drive apparatus for a vehicle.

Next, operating states of the drive apparatus for a vehicle 80 will be described. FIGS. 10 to 15B are explanatory diagrams illustrating operating states of the drive apparatus for a vehicle 80. FIG. 10 illustrates a state in which the vehicle is stopped, FIG. 11 illustrates a state in which the vehicle is running forward in the engine drive mode, and FIG. 12 illustrates a state in which the vehicle is running forward in the parallel drive mode. FIG. 13 illustrates a state in which the vehicle is running forward in the motor drive mode, and FIG. 14 illustrates a state in which the vehicle is running in reverse in the engine drive mode. FIG. 15A illustrates a state in which regenerative braking operates when the vehicle decelerates, and FIG. 15B illustrates a state in which regenerative braking operates immediately before the vehicle is stopped. In FIGS. 10 to 15B, hatched arrows represent power transmission paths. Also in FIGS. 10 to 15B, terms "ROTATION STOP", "FORWARD ROTATION", "REVERSE ROTATION", "HIGH SPEED", and "LOW SPEED" represent rotational states of the engine output shaft 82 (inner race 86a) and the hollow shaft 89 (inner race 91a).

As illustrated in FIG. 10, when the vehicle is stopped, the engine 11 starts while the forward clutch 39 and the reverse brake 40 remain released. In this case, since the engine output shaft 82 rotates and the hollow shaft 89 stops, the engine power is transmitted to the oil pump 41 through the power transmission path 87. Thus, the oil pump 41 can be driven by the engine power when the vehicle stops.

Referring next to FIGS. 11 and 12, when the vehicle is running forward in the engine drive mode or the parallel drive mode, the forward clutch 39 is engaged while the reverse brake 40 remains released. When the forward clutch 39 is engaged, the rotation speeds of the engine output shaft 82 and the hollow shaft 89 match. Here, the rotation speed of the carrier 85 driven by the engine output shaft 82 decreases more than the rotation speed of the carrier 85 driven by the hollow shaft 89 does. Thus, the power is transmitted to the oil pump 41 from the hollow shaft 89 through the one-way clutch 91. That is, as a result of the carrier 85 being rotated by the hollow shaft 89, the sun gear 84 rotates at a speed higher than that at which the engine output shaft 82 rotates, thereby setting the one-way clutch 86 to the released state in which the power is not transmitted. Thus, the oil pump 41 can be driven by the engine power when the vehicle is running forward in the engine drive mode or the parallel drive mode. In the engine drive mode, the motor generator 17 is controlled so as to enter an idle rotation state. In the parallel drive mode, the motor generator 17 is controlled so as to enter the powering state.

As illustrated in FIG. 13, when the vehicle is running forward in the motor drive mode, the forward clutch 39 is released and the engine 11 is stopped from the above-described state in which the vehicle is running forward in the parallel drive mode. In this case, since the engine output shaft 82 stops and the hollow shaft 89 continues to rotate, the motor power is transmitted to the oil pump 41 through the power transmission path 92. Thus, the oil pump 41 can be driven by the motor power when the vehicle is running forward in the motor drive mode. When the drive mode is switched from the parallel drive mode to the motor drive mode, the power transmission path is automatically switched from the power transmission path 87 to the power transmission path 92 due to a decrease in the rotation speed of the engine output shaft 82.

As illustrated in FIG. 14, when the vehicle is running in reverse in the engine drive mode, the state of the reverse brake 40 is switched to an engaged state from the above-described state in which the vehicle is stopped. In this case, since the hollow shaft 89 rotates in a direction opposite the rotation direction of the engine output shaft 82 that rotates in the forward direction, the engine power is transmitted to the oil pump 41 through the power transmission path 87. Thus, the oil pump 41 can be driven by the engine power when the vehicle is running in reverse in the engine drive mode.

Referring next to FIG. 15A, when regenerative braking operates due to release of the accelerator pedal or depression of the brake pedal, the forward clutch 39 is released and the motor generator 17 is controlled so as to enter a regenerative state. In this case, since the engine 11 is stopped or operated at a low load, the hollow shaft 89 rotates at a rotation speed higher than that at which the engine output shaft 82 rotates, and accordingly, the power from the driving wheel 13 is transmitted to the oil pump 41 through the power transmission path 92. Thus, the oil pump 41 can be driven by the power from the driving wheel 13 when regenerative braking operates. At a time immediately before the vehicle stops in which the rotation speed of the hollow shaft 89 decreases, the rotation speed of the engine 11 is increased to a range required for driving the oil pump 41 in order to maintain a driving state of the oil pump 41. Since this makes the rotation speed of the engine output shaft 82 be higher than that of the hollow shaft 89, the engine power is transmitted to the oil pump 41 through the power transmission path 87.

Thus, since the power transmission path 87 that transmits the power from the engine output system 12 to the oil pump 41 and the power transmission path 92 that transmits the power from the power transmission system 14 to the oil pump 41 are provided, the engine 11 of the engine output system 12 can be stopped while the driving state of the oil pump 41 is maintained. That is, as illustrated in FIGS. 13 and 15A, when the engine 11 is stopped, the oil pump 41 can be driven by the power from the power transmission system 14, thereby eliminating the need for a separate power source of the oil pump 41 that otherwise would be provided so as to supply the power when the engine 11 is stopped. Thus, simplification and cost reduction of the drive apparatus for a vehicle 80 can be achieved. In addition, since the power transmission paths 87 and 92 respectively include the one-way clutches 86 and 91, the power transmission paths 87 and 92 can be appropriately switched from one to the other without complex control.

In addition, the gear ratios are different between the power transmission paths 87 and 92. The power transmission paths 87 transmits the power from the engine output shaft 82 to the oil pump 41 through the one-way clutch 86, the sun gear 84, and the carrier 85, and the power transmission path 92 transmits the power from the hollow shaft 89 to the oil pump 41 through the one-way clutch 91 and the carrier 85. Thus, since the power can be constantly transmitted to the oil pump 41 from either one of the power transmission paths 87 and 92, generation of noise that otherwise would occur due to play or the like of components included in the power transmission paths 87 and 92 can be suppressed.

The present invention is not limited to the above-described embodiments. It is clear that a variety of modifications can be implemented without departing from the gist of the present invention. For example, the one-way clutches 44, 51, 86, and 91 are not limited to sprag one-way clutches. The one-way clutches 44, 51, 86, and 91 may use another type of one-way clutch. In the above description, the first power transmission paths 72 and 87 are provided between the turbine shaft 34 and the oil pump 41. However, this does not limit where the first power transmission paths 72 and 87 are provided. The first power transmission paths 72 and 87 may be provided between the crank shaft 32, which is part of the engine output system 12, and the oil pump 41. In the above description, the second power transmission paths 74 and 92 are provided between the primary shaft 20 and the oil pump 41. However, this does not limit where the second power transmission paths 74 and 92 are provided. The second power transmission paths 74 and 92 may be provided between the secondary shaft 21, which is part of the power transmission system 14, and the oil pump 41. Furthermore, the oil pump 41 is not limited to the trochoid pump. The oil pump 41 may use another type of internal gear pump, or may use an external gear pump.

The vehicle illustrated in the figures is a hybrid vehicle equipped with the motor generator 17 in the power transmission system 14. However, vehicles to which the present invention is applied are not limited to hybrid vehicles. The present invention is also effectively applicable to any vehicle as long as the engine 11 of which can be stopped while the vehicle is running.

What is claimed is:

1. A drive apparatus for a vehicle provided with an engine output system that connects an engine and a clutch mechanism, and a power transmission system that connects the clutch mechanism and a driving wheel, the drive apparatus comprising:

an oil pump that supplies a hydraulic oil to a transmission mechanism of the power transmission system;

a first power transmission path that is provided between the engine output system and a first end side of the oil pump, the first power transmission path connecting the engine output system to the first end side of the oil pump in a first gear ratio;

a first one-way clutch that is provided in the first power transmission path, the first one-way clutch transmitting a power from the engine output system to the oil pump while cutting off the power from the oil pump to the engine output system;

a second power transmission path that is provided between the power transmission system and a second end side of the oil pump, the second power transmission path connecting the power transmission system to the second end side of the oil pump in a second gear ratio;
a second one-way clutch that is provided in the second power transmission path, the second one-way clutch transmitting the power from the power transmission system to the oil pump while cutting off the power from the oil pump to the power transmission system,
   wherein the power is transmitted to the oil pump through the first power transmission path or the second power transmission path,
   wherein the second power transmission path is provided between an input side of the power transmission system and the oil pump,
   wherein the first gear ratio of the first power transmission path is set to be less than the second gear ratio of the second power transmission path,
   wherein, when the clutch mechanism is engaged, the power is transmitted to the oil pump through the first power transmission path from the engine, and
   wherein the clutch mechanism is located between the first power transmission path and the second power transmission path such that the clutch mechanism is configured to synchronize a rotational speed of a turbine shaft that transfers the power from the engine output system to the first power transmission path with a rotational speed of a primary shaft that transfers the power from the power transmission system to the second power transmission path;
a first drive shaft connected between the first one-way clutch and the first end side of the oil pump;
a second drive shaft connected between the second one-way clutch and the second end side of the oil pump,
   wherein the first power transmission path is connected to the first drive shaft via the first one-way clutch and the second power transmission path is connected to the second drive shaft via the second one-way clutch,
   a direction of an extension of the first drive shaft and a direction of an extension of the second drive shaft falling on a same line such that the first drive shaft and the second drive shaft are rotated as a single shaft, and
   wherein the engine output system comprises a torque converter connected to the engine via a crank shaft;
a motor generator connected to an end of the primary shaft;
a first drive sprocket of the first power transmission path drivingly connected to the turbine shaft;
a second drive sprocket of the second power transmission path drivingly connected to the primary shaft;
a primary pulley provided on the primary shaft between the second drive sprocket and the motor generator; and
a forward/backward switching mechanism provided between the first drive sprocket and the second drive sprocket,
wherein the turbine shaft extends collinearly with the primary shaft such that the torque converter, the first drive sprocket, the forward/backward switching mechanism, the second drive sprocket, and the primary pulley are sequentially arranged between the engine and motor generator along a direction of an extension of the turbine shaft and the primary shaft.

2. The drive apparatus for a vehicle according to claim 1, wherein a torque carrying capability of the second power transmission path is set to be less than a torque carrying capability of the first power transmission path.

3. The drive apparatus for a vehicle according to claim 1, wherein each of the first and second power transmission paths includes a gear mechanism or a chain mechanism.

4. The drive apparatus for a vehicle according to claim 1, wherein the motor generator is incorporated into the power transmission system.

5. The drive apparatus for a vehicle according to claim 1, wherein the first end side of the oil pump and the second end side of the oil pump are located on opposing sides of the oil pump.

6. The drive apparatus for a vehicle according to claim 1, wherein the oil pump comprises a rotor, the first end side of the oil pump and the second end side of the oil pump being located on opposing sides of the rotor.

7. The drive apparatus for a vehicle according to claim 1, wherein the second power transmission path is provided between the power transmission system and the second end side of the oil pump independent of the first power transmission path that is provided between the engine output system and the first end side of the oil pump.

8. The drive apparatus for a vehicle according to claim 1, wherein the power transmission system includes:
   a primary oil chamber located on a rear side of the primary pulley;
   a secondary shaft parallel to the primary shaft and provided with a secondary pulley, a secondary oil chamber being located on a rear side of the secondary pulley; and
   a driving chain trained around the primary pulley and the secondary pulley for connecting the primary shaft to the secondary shaft.

9. The drive apparatus for a vehicle according to claim 8, wherein the power is transmitted to the oil pump through the first power transmission path or the second power transmission path depending on rotational speeds of the turbine shaft and the primary shaft.

10. The drive apparatus for a vehicle according to claim 9, wherein the turbine shaft is parallel to the secondary shaft.

11. The drive apparatus for a vehicle according to claim 10, wherein the first end side of the oil pump and the second end side of the oil pump define opposing surfaces of a rotor of the oil pump.

12. The drive apparatus for a vehicle according to claim 11, wherein the first drive shaft and the second drive shaft are parallel to the primary shaft and the turbine shaft.

13. The drive apparatus for a vehicle according to claim 9, further comprising:
   a first driven sprocket connected between the first one-way clutch and the turbine shaft; and
   a second driven sprocket connected between the second one-way clutch and the primary shaft.

14. The drive apparatus for a vehicle according to claim 13, wherein, when the rotation speed of the first driven sprocket driven by the turbine shaft is more than the rotation speed of the second driven sprocket driven by the primary shaft, the second one-way clutch is released and the first one-way clutch is engaged to transmit the power from the first power transmission path to the oil pump.

15. The drive apparatus for a vehicle according to claim 14, wherein, when the rotation speed of the first driven sprocket is less than the rotation speed of the second driven sprocket, the first one-way clutch is released and the second one-way clutch is engaged to transmit the power from the second power transmission path to the oil pump.

16. The drive apparatus for a vehicle according to claim 1, wherein the power transmission system includes the primary shaft provided with a pulley.

17. The drive apparatus for a vehicle according to claim 16, wherein, when the clutch mechanism is released and the engine is stopped while the vehicle is running, the turbine shaft stops and the primary shaft continues to rotate.

18. The drive apparatus for a vehicle according to claim 1, wherein the turbine shaft comprises:
- a first shaft located between the engine output system and the first power transmission path; and
- a second shaft located between the first power transmission path and the clutch mechanism.

19. The drive apparatus for a vehicle according to claim 18, wherein the first shaft of the turbine shaft and the second shaft of the turbine shaft are connected to opposing sides of the first power transmission path such that a direction of an extension of the first shaft of the turbine shaft and a direction of an extension of the second shaft of the turbine shaft fall on a same line.

20. The drive apparatus for a vehicle according to claim 1, wherein the first power transmission path and the second power transmission path are separated and are arranged on both sides of the single shaft, and
- wherein the first power transmission path and the second power transmission path transmit the power from the engine output system and the driving wheel to the oil pump.

* * * * *